(12) United States Patent
Calvet et al.

(10) Patent No.: US 11,787,745 B2
(45) Date of Patent: Oct. 17, 2023

(54) ELABORATION OF AN ADVANCED CERAMIC MADE OF RECYCLED INDUSTRIAL STEEL WASTE

(71) Applicant: Khalifa University of Science and Technology, Abu Dhabi (AE)

(72) Inventors: Nicolas Jean-Michel Calvet, Abu Dhabi (AE); Uver Dario Villalobos Cardozo, San Jose (CR); Khaloud Mohammed Al Na'Imi, Abu Dhabi (AE); Jean Francois Hoffmann, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 941 days.

(21) Appl. No.: 16/487,308

(22) PCT Filed: Feb. 22, 2018

(86) PCT No.: PCT/IB2018/051117
§ 371 (c)(1),
(2) Date: Aug. 20, 2019

(87) PCT Pub. No.: WO2018/154487
PCT Pub. Date: Aug. 30, 2018

(65) Prior Publication Data
US 2020/0055781 A1 Feb. 20, 2020

Related U.S. Application Data

(60) Provisional application No. 62/462,049, filed on Feb. 22, 2017.

(51) Int. Cl.
*C04B 35/622* (2006.01)
*C04B 35/057* (2006.01)
(Continued)

(52) U.S. Cl.
CPC ...... *C04B 35/62204* (2013.01); *C04B 35/057* (2013.01); *C04B 35/2683* (2013.01);
(Continued)

(58) Field of Classification Search
CPC ............ C04B 35/62204; C04B 35/057; C04B 35/2683; C04B 35/6261; C04B 35/6265;
(Continued)

(56) References Cited

U.S. PATENT DOCUMENTS 6,342,461 B1 * 1/2002 Lee ..................... C04B 33/1327
501/141

FOREIGN PATENT DOCUMENTS

CN 102765931 A 11/2012
CN 104844158 A 8/2015
(Continued)

OTHER PUBLICATIONS

International Search Report and Written Opinion dated Jun. 8, 2018, issued in PCT Patent Application No. PCT/IB2018/051117, 13 pages.
(Continued)

*Primary Examiner* — James A Fiorito
(74) *Attorney, Agent, or Firm* — Billion & Armitage

(57) ABSTRACT

A ceramic and a method of forming a ceramic including milling steel slag exhibiting a diameter of 5 mm of less to form powder, sieving the powder to retain the powder having a particle size in the range of 20 to 400 removing free iron from the powder with a magnet, heat treating the powder at a temperature in the range of 700° C. to 1200° C. for a time period in the range of 1 hour to 10 hours and oxidizing retained iron in the powder, compacting the powder at a compression pressure in the range of 20 MPa to 300 MPA, and sintering the powder at a temperature in the range
(Continued)

of 700° C. to 1400° C. for a time period in the range of 0.5 hours to 4 hours to provide a ceramic.

20 Claims, 15 Drawing Sheets

(51) Int. Cl.
  *C04B 35/26* (2006.01)
  *C04B 35/626* (2006.01)
  *C04B 35/634* (2006.01)
  *C04B 35/645* (2006.01)
  *C09K 5/14* (2006.01)
  *F28D 19/04* (2006.01)

(52) U.S. Cl.
  CPC ...... *C04B 35/6261* (2013.01); *C04B 35/6265* (2013.01); *C04B 35/62675* (2013.01); *C04B 35/63416* (2013.01); *C04B 35/645* (2013.01); *C09K 5/14* (2013.01); *F28D 19/04* (2013.01); *C04B 2235/3206* (2013.01); *C04B 2235/3208* (2013.01); *C04B 2235/3217* (2013.01); *C04B 2235/3272* (2013.01); *C04B 2235/3418* (2013.01); *C04B 2235/6562* (2013.01); *C04B 2235/6567* (2013.01); *C04B 2235/661* (2013.01); *C04B 2235/9607* (2013.01)

(58) Field of Classification Search
  CPC ........ C04B 35/62675; C04B 35/63416; C09K 5/14; F28D 19/04
  See application file for complete search history.

(56) References Cited

FOREIGN PATENT DOCUMENTS

| CN | 106082962 A | 11/2016 |
|---|---|---|
| CN | 106220219 A | 12/2016 |
| CN | 106242509 A | 12/2016 |
| CN | 106278179 A | 1/2017 |
| CN | 106415186 A | 2/2017 |
| WO | 2016011668 A1 | 1/2016 |

OTHER PUBLICATIONS

Preliminary Report on Patentability dated Sep. 6, 2019, issued in PCT Patent Application No. PCT/IB2018/051117, 8 pages.

"Communication pursuant to Rule 164(1) EPC", EP App. No. 18757488.4, dated Nov. 5, 2020, 6 pages.

Zhao, et al., "Preparation of novel ceramics with high Cao content from steel Slag", Materials and Design, London, GB, vol. 64, XP029064774, ISSN: 0261-3069, DOI: 10.1016/J.MATDES.2014.08.015, Aug. 23, 2014, pp. 608-613.

"Extended European Search Report Received" for Application No. 18757488.4, dated Mar. 9, 2021.

Wei, et al., "Sintering Mechanism of Ceramics Prepared from BOF Slag", Chemistry Science Journal, vol. 65, No. 9, 9/30/2104, pp. 3732-3737.

Chinese Office Action based on Chinese Application No. 201880019613.6, dated Feb. 20, 2021, 15 pages.

"Notice of Hearing Date Received/ Subsequent Examination Report dated Apr. 19, 2023", IN Application No. 201927037883, 3 Pages.

* cited by examiner

ELABORATION OF AN ADVANCED CERAMIC MADE OF RECYCLED INDUSTRIAL STEEL WASTE

FIELD

The present disclosure is directed to a ceramic formed from recycled industrial steel waste and a method of forming such ceramics.

BACKGROUND OF THE INVENTION

Worldwide, several million tons of waste, called slags, are produced by the steel industry causing waste management concerns. The slags are all the non-metallic parts of cast iron which naturally rises up by lower density at the surface of the fusion in the furnace. Before tapping the molten steel, slags are poured out of the furnace on the ground. The poured hot slags are collected by heavy duty shovel loader and moved to the cooling chambers for water spraying in order to load it on a dump truck and be transported to the next step of metal recovery.

In the United Arab Emirates (UAE), Emirates Steel is a massive steel factory located in Abu Dhabi manufacturing about 3.5 Million tons of steel products per year. From this production, about 700,000 tons of steel slags are generated on a yearly basis. Around 30% to 40% of this by-product is recycled as aggregate for road construction or rail way ballast, currently sold for a price of about $3/ton. However, the rest, which represents more than 400,000 tons a year, does not presently have useful applications and is stored on site waiting for potential future new applications. As landfilling industrial waste is forbidden in the country, the slag is waste management issue and action is needed to identify new markets to utilize these slags.

Efforts have been made to reuse slags for different purposes. Waste from the metallurgical industry are by-products generated directly throughout the industrial process and, often, do not require supplementary treatment to be reused safely. At the present time, the slags are used in the cement production industry as a complement to the clinker, producing the known Portland blast furnace slag cement (PBFS). Another way to reuse the steel slags is as an additive in the production of ceramic tiles. In addition, steel slags may be used as asphalt aggregate for roads and for the construction of dams. It could also help the stabilization of river bottoms, river banks, among others. The efforts are to protect the environment, human health and have an efficient use of the resources with minimum environmental impact. These applications targeting the recycling of large quantities of waste at relatively low added value.

SUMMARY OF THE INVENTION

An aspect of the present disclosure relates to a method of forming a ceramic from steel slag. The method includes milling steel slag exhibiting a diameter of 5 mm of less to form powder, sieving the powder to retain the powder having a particle size in the range of 20 µm to 400 µm, removing free iron from the powder with a magnet, heat treating the powder at a temperature in the range of 700° C. to 1200° C. for a time period in the range of 1 hour to 10 hours and oxidizing retained iron in the powder, compacting the powder at a compression pressure in the range of 20 MPa to 300 MPa, and sintering the powder at a temperature in the range of 700° C. to 1400° C. for a time period in the range of 0.5 hours to 4 hours to provide a ceramic.

In another aspect, the present disclosure is directed to a ceramic. The ceramic includes a consolidated body of steel slag, wherein the steel slag comprises: aluminum oxide ($Al_2O_3$) present in the range of 2 to 12 wt. %, calcium oxide (CaO) present in the range of 24 to 60 wt. %, iron oxide ($Fe_2O_3$) present in the range of 20 to 33 wt. %, magnesium oxide (MgO) present in the range of 3 to 15 wt. %, silicon dioxide ($SiO_2$) present in the range of 9 to 20 wt. %, optionally, one or more of the following: MnO, $TiO_2$, and free CaO present in the range of 0.01 to 8 wt. %, and inevitable impurities, wherein the wt % is the weight percent relative to the total weight of the ceramic to provide, including the inevitable impurities, 100 wt. %, wherein the ceramic exhibits a density in the range of 2550 kg/m$^3$ to 2725 kg/m$^3$ and the ceramic exhibits a compressive strength at failure in the range of 40 MPa to 120 MPa measured at a strain rate of $10^{-6}$ mm/mm/min.

In yet a further aspect, the present disclosure relates to a thermal energy storage system. The thermal energy storage system includes a storage container; a plurality of ceramic modules placed within the storage container; a heat transfer fluid contacting the ceramic modules; an inlet diffuser in fluid communication with said storage container; and an outlet diffuser in communication with said tank, wherein said inlet diffuser, said storage container, said ceramic modules, and said outlet diffuser define a flow path for said heat transfer fluid. The ceramic modules comprise a consolidated body of steel slag, wherein the steel slag comprises: aluminum oxide ($Al_2O_3$) present in the range of 2 to 12 wt. %, calcium oxide (CaO) present in the range of 24 to 60 wt. %, iron oxide ($Fe_2O_3$) present in the range of 20 to 33 wt. %, magnesium oxide (MgO) present in the range of 3 to 15 wt. %, silicon dioxide ($SiO_2$) present in the range of 9 to 20 wt. %, optionally, one or more of the following: MnO, $TiO_2$, and free CaO present in the range of 0.01 to 8 wt. %, and inevitable impurities, wherein the wt % is the weight percent relative to the total weight of the ceramic to provide, including the inevitable impurities, 100 wt. %, wherein the ceramic exhibits a density in the range of 2550 kg/m$^3$ to 2725 kg/m$^3$ and the ceramic exhibits a compressive strength at failure in the range of 40 MPa to 120 MPa measured at a strain rate of $10^{-6}$ mm/mm/min.

BRIEF DESCRIPTION OF THE DRAWINGS

The above-mentioned and other features of this disclosure and the manner of attaining them will become more apparent with reference to the following description of embodiments herein taking in conjunction with the accompanying drawings, wherein:

FIG. 8b is a photographic image of a base component of the mold die of FIG. 8a. FIG. 8d is a photographic image of a punch component of the mold die of FIG. 8a.

DETAILED DESCRIPTION OF THE INVENTION

As noted above, the present disclosure is directed to a ceramic and a method of forming such ceramic from recycled industrial steel waste, and particularly steel slag. In preferred embodiments, the advanced ceramics are formed using a dry powder compaction process and, as illustrated below, the density and compressive strength may be adjusted, as well as thermal properties, depending on application. The ceramics, which exhibit compressive strengths greater than that of graphite and other compressed solids formed from alumina powder, may be used, e.g., for thermal storage systems, as the ceramics can store heat in the solid material up to 1,000° C.

There are a number of types of steel slags recoverable from the steel making process. Steel slag is understood to be slag recovered from the steel making process, as opposed to slag generated from smelting and formation of copper, lead, nickel or other metals. As noted above, the slag is the non-metallic portions of ore that naturally rise up in smelting and refining of the ore, such as in iron ore. Slag may also be introduced into a furnace to protect the molten steel from air and oxidation.

Figure 1:
FIG. 1 is an image of the as-received slag.
Figure 2:
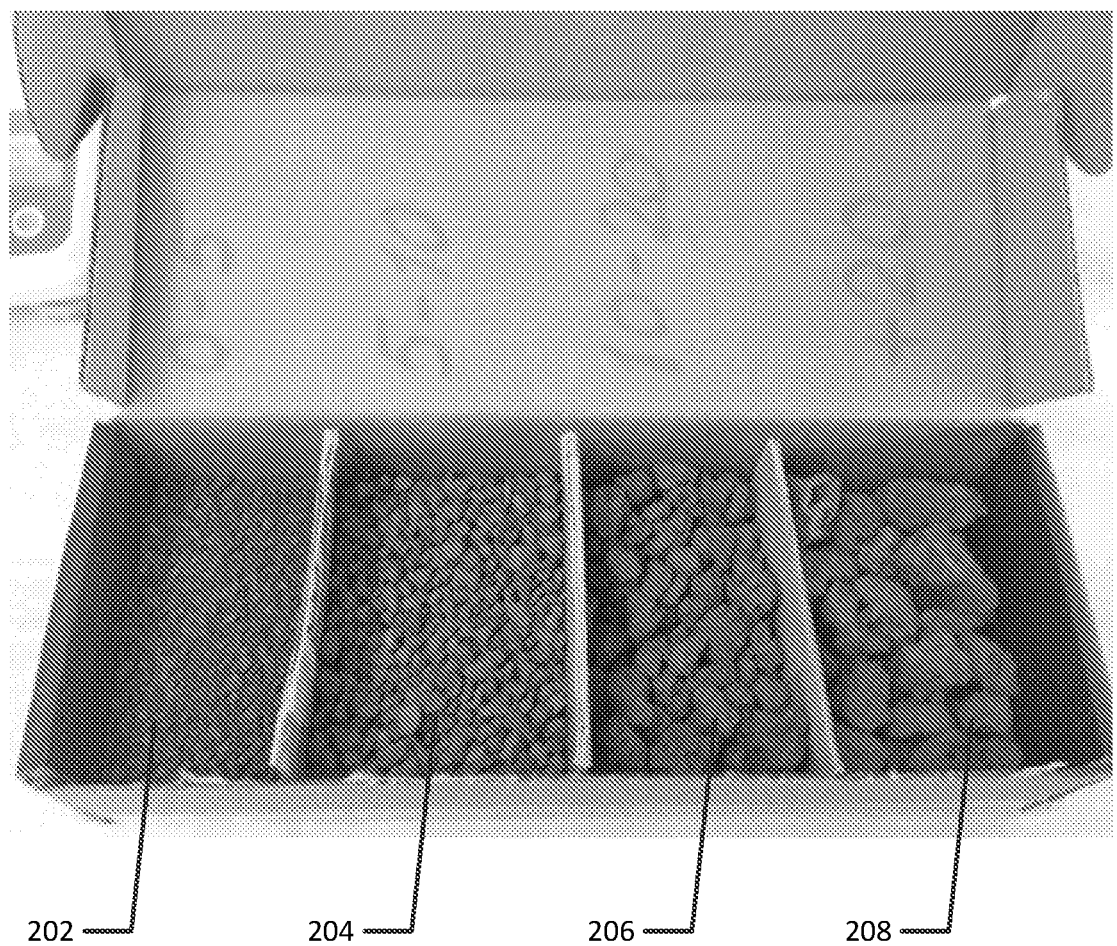
FIG. 2 is an image of the four categories of slags (0-5 mm; 5-10 mm; 10-20 mm; >20 mm) as-received from Emirates Steel.

Raw electric arc furnace (EAF) slags, also called black slags, are produced in the form of coarse aggregate. EAF slags are introduce in the furnace to protect the molten steel bath from air and oxidation as by their lower density than steel, EAF slags are located in the upper part of the mixture. Once extracted from the EAF, the slags are cooled down and solidified, then crushed in order to recover valuable iron content using a magnet. FIG. 1 is a photograph of the raw EAF slags 102 produced in the steel production process. FIG. 2 illustrates four different sizes of EAF slag that may be obtained: [0-5 mm] 202, [5-10 mm] 204, [10-20 mm] 204, and >20 mm 208, from left to right in the photograph. The EAF slag comprises, and preferably consists essentially of:

aluminum oxide ($Al_2O_3$): from 2 to 12 wt. %,
calcium oxide (CaO): from 24 to 60 wt. %,
iron oxide ($Fe_2O_3$): from 20 to 33 wt. %,
magnesium oxide (MgO): from 3 to 15 wt. %,
silicon dioxide ($SiO_2$): from 9 to 20 wt. %,
optionally one or more of the following: from 0.01 to 8 wt. %.

MnO, $TiO_2$, and free CaO and inevitable impurities, wherein the wt % is the weight percent relative to the total weight of the slag composition to provide, including the inevitable impurities, 100 wt. %. The inevitable impurities are, generally, unavoidable and are often a result of the process environment, feedstocks, or the process equipment. Inevitable impurities may be present from 0.01 to 10.0 wt. % of the composition. The CaO present from 24 to 60 wt % is preferably reacted with other components forming various CaO crystal phases (this is 24-60% CaO), which may include, for example, one or more of the following: $Ca_2SiO_4$, $4CaO \cdot Al_2O_3 \cdot Fe_2O_3$, $Ca_2Al(Al-SiO_7)$, $Ca_3SiO_5$, $2CaO \cdot Al_2O_3 \cdot SiO_2$, FeO, $Fe_3O_4$, MgO, and $SiO_2$. The unreacted amount (free CaO) may exhibit different crystal phases (included in the traces %) than the reacted CaO.

Alternatively, or in addition to the use of EAF slag, other slag types may be utilized in the methods described. For example, basic oxygen furnace (BOF) slags are generated in BOF process where pressurized oxygen is blown in the furnace to oxidize the charge and remove the unwanted elements. Similar to EAF slags, BOF slags are tapped from the furnace and water-quenched to form coarse aggregate. Molten steel from primary steel manufacturing process undergoes a reduction process in a ladle furnace (LF) to obtain a high quality steel. The by-product of this process is white powder LF slags which play an important role in final steel desulphurization, degassing, impurities removal and decarburization. Blast furnace (BF) slags are by-products of iron-making industry. During the smelting process, lime in flux reacts with iron ore and coke to form a floating slag layer. Different types of BF slags ranging from fine powder to coarse aggregate can be obtained based on the cooling method. BF slags are commonly used in cement industry.

Figure 3:
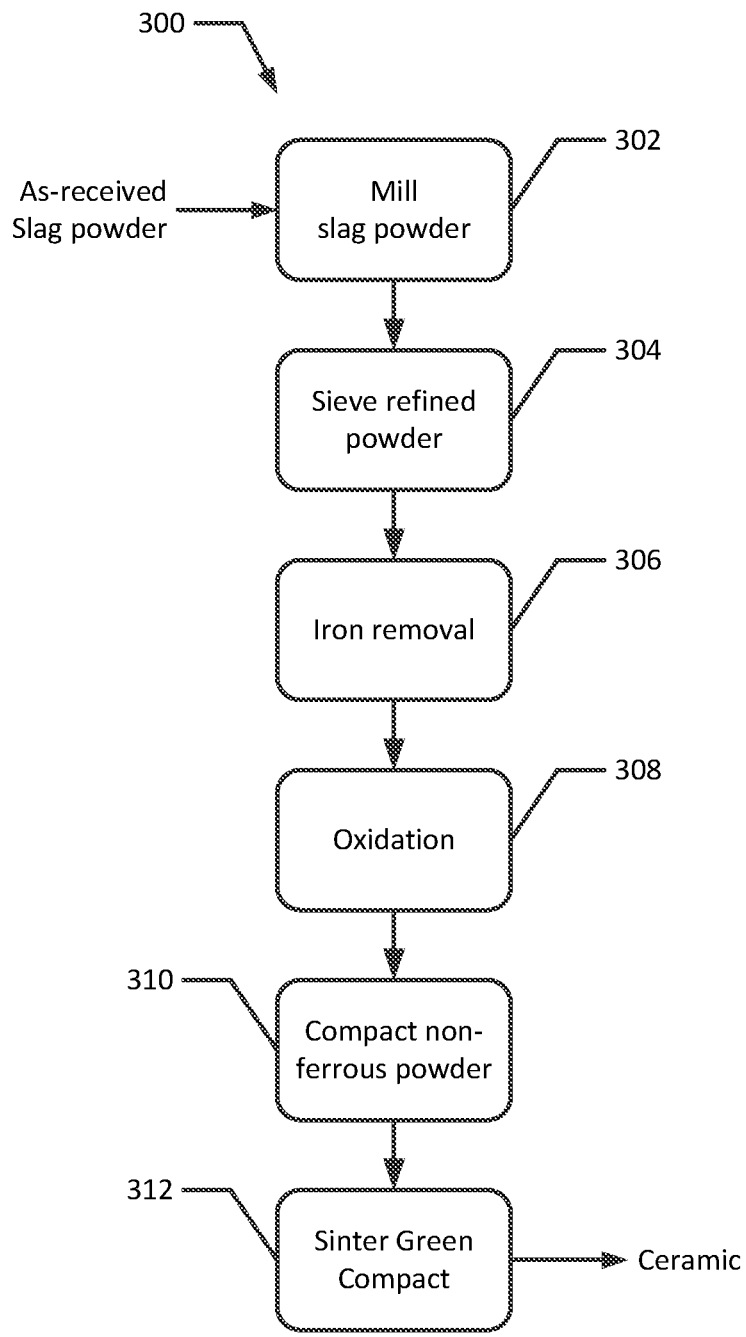
FIG. 3 is a schematic of a 5-step method of forming the as-received slags into the ceramics by dry powder compaction.

Preferably, a multi-step method 300, illustrated in flow chart of FIG. 3, is used to form the EAF slag ceramics described herein, the method embodying: (1) milling, and preferably ball milling, the as-received slags 302 to obtain a powder with the desired particles size/particle size distribution, then (2) sieving the ground powder to obtain a homogenous mix 304, (3) optionally, removing free iron content using a magnet 306, (4) then oxidizing the powder in a furnace to obtain a non-ferrous slag powder 308, (5) compressing at high pressure to obtain a solid called green compact 310, and finally (6) sintering at high temperature to bond all the particles together and obtain a ceramic 312.

Expanding on the above, the as-received slags, which exhibit a particle size (longest linear dimension) of 5 mm or less, are subjected to a milling or crushing process, and preferably ball milling. The particles are preferably reduced to a powder size of 400 μm or less, wherein the size is the longest linear dimension of the powders. When using a commercial ball mill, the particles are preferably crushed for a period of time in the range of 0.5 hours to 2 hours including all values and ranges therein. The balls provide the grinding media and may be selected from a number of sizes in the range of, for example, 2 mm to 40 mm, including all values and increments therein. It may be appreciated that varying other ranges may be utilized.

The milled powder is then sieved to obtain a homogenous mixture of powder with particles sizes between 20 to 400 μm, including all values and ranges therein. A homogenous mixture may be understood as a uniform distribution of the shape, size, and surface area of the constituent particles of the mixture. In particularly preferred embodiments, the powders are screened to a size in the range of 20 μm and 200 μm. In addition, the mean particle size of the particles is preferably in the range of 50 μm to 70 μm, including all values and ranges therein.

The powder may then be treated to remove iron present in the slag powder. In a first step, the free iron, i.e., iron not entrained within the powder particles, is preferably removed using a magnet. The retained iron in the powder is preferably then oxidized by a heat treatment process with an isothermal temperature between 800° C. to 1100° C., including all values and ranges therein and preferably 1000° C., for 1 to 10 hours, including all values and ranges therein.

After removal or oxidation of the iron, additives are optionally, but preferably, included prior to the compaction process. The additives may increase the bond between particles. In particular, a binder, including a polymer and water is mixed with the powder to hold the powders together in the green (i.e., un-sintered) state. A non-limiting example of a binder formulation includes polyvinyl alcohol (PVA) and water. Polymers that may be used in addition to, or instead of, polyvinyl alcohol include poly (alkylene carbonate), starches, carboxymethylcellulose, dextrin, and waxes. The polymer may be added in the range of 0.01 wt % to 10 wt % of the total powder formulation and preferably in the range of 0.01 wt % to 5 wt % of the total formulation. Other optional additives, may be mixed with the powder as required. Such additional additives include, but are not limited to lubricants, surfactants, dispersants, flocculants, and plasticizers. In particular, dry lubricants are added to reduce the friction during compressing. Dry lubricants include, but are not limited to, aluminum stearate, zinc stearate, talc, graphite, etc. Clay may be added in the range of 30 wt % to 50 wt % of the total powder formulation to increase elasticity. Water may be used as a carrier of, not only the binder, but also other additives. In addition, or alternatively, to water, other carriers may be utilized. Other carriers may include organic liquids such as organic solvents. Preferred organic solvents include short chain alcohols having a carbon number of 20 or less, such as ethanol, acetone, butanol, glycerin, etc. The carrier may be present in the range of 2% to 20% of the total powder formulation, including all values and ranges therein, such as 2% to 10%.

The additives, including the binders and carriers, may be provided in an amount within a range from 0 wt. % to 60 wt. % of the total weight of the powder formulation (slag powder and additives), including all ranges and values therein, and the slags are preferably present in an amount in the range of 40 wt. % to 100 wt. % of the powder formulation, including all values and ranges therein. Due to the nature of the slags and the desired shape of the final ceramic product, the use of the binders may ease binding between the particles. The powder compositions are then formed into the ceramic, preferably using either a cold or a hot dry compaction process.

In the cold, dry compaction process, the ceramic is made by two successive steps: a compaction process to obtain green bodies, followed by a sintering process. After mixing the slag powder with the additive(s), if any, the powder is then compressed. In preferred embodiments, the powder is placed in a mold, which is in turn placed into a press. In embodiments, the mold may be heated. An example of a mold is discussed further below in the examples. In embodiments, the slag powder may be compacted into variety of shapes.

Figure 5A:
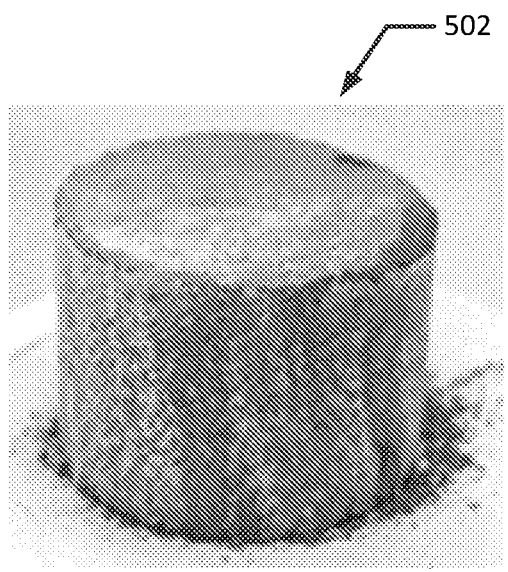
FIG. 5a is an image of an example of a green compact.

The compressing pressure for powder varies—depending, in part, on the nature of the powder. For example, zirconium dioxide has compacting pressure between 170 kPa and 400 kPa. For other powders, the compressing pressure is between 100 MPa and 165 MPa. However, for the steel slag powders herein, the pressure falls in the range of 30 MPa to 300 MPa, including all values and ranges therein, and preferably 120 to 180 MPa and more preferably 160 MPa to 180 MPa, to obtain a compacted green solid, referred to as a green compact. FIG. 5a is an image of an example of a green compact 502.

After compacting, the green compact is sintered at relatively high temperatures to improve strength. Sintering may be performed in a sintering chamber, for example, a furnace or oven, and preferably occurs in an ambient environment; however, it is also contemplated that sintering may be performed in a vacuum or in a low oxygen environment. A temperature program including a preheating stage and a sintering stage is preferably used. During the preheating stage, in which the temperature in the sintering chamber is transitioned from room temperature (20 to 25° C.) to sintering temperature, a relatively slow heating rate is used, the heating rate being in the range of 1 K/min to 10 K/min, and preferably at 5 K/min, including all values and ranges therein. The time of the preheating stage is preferably between 0.5 to 2 hours, including all values and ranges therein. As the temperature transitions from about 200° C. to 800° C., the moisture evaporates and the additives, if any, burn out.

The sintering temperature is selected to be between 50% and 90% of the melting point of the material. Accordingly, the sintering temperature is in the range of 800° C. and 1400° C., and preferably chosen in the range of 1000° C. to 1400° C., in the case of the steel slags herein. The sintering time (or hold time) is in the range of 0.5 hours to 4 hours, including all values and ranges therein such as 1100° C. During sintering, the material experiences water release, if any; burning of the binder, if any; and the formation of grain boundaries in the ceramic microstructure. While the process consumes energy in pressing and sintering, an advantage of dry powder compacting is that a number of shapes may be achieved that are not otherwise achieved by casting.

Figure 5B:
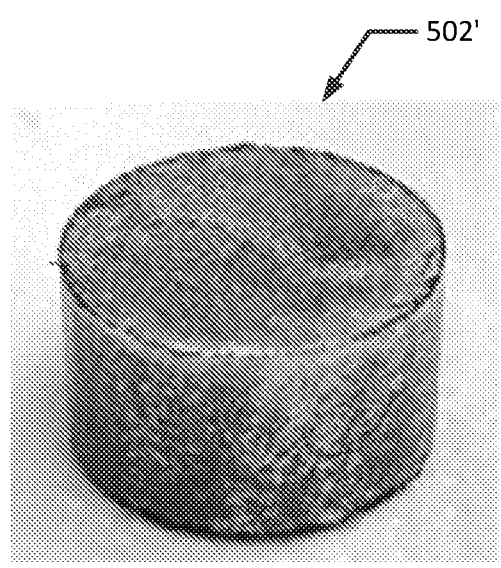
FIG. 5b is an image of an example of a ceramic.

In hot, dry compression process, the ceramic is made within one step; wherein, heat treatment takes place at the same time as compressing. After mixing the slag powder and the additives, if any, the powder is placed into the compacting mold and compressed while heated. For the slag powders herein, the compressing pressure is preferably in the range of 20 to 300 MPa, including all values and ranges therein. The sintering temperature is in the range of 700° C. and 1200° C., including all values and ranges therein, with holding time between 0.5 to 4 hours, including all values and ranges therein. A slow heating rate in a range from 1 to 10 K/min, and preferably 1 K/min, is used to raise the temperature of the oven/furnace chamber up to the sintering temperature. The ceramic is held in the mold, while the sintering temperature is maintained. The resulting ceramic may therefore be understood as a consolidated mass or body of the steel slag powder, in which the slag powder is fused together. An image of a ceramic 502', after sintering is shown in FIG. 5b.

After sintering in either the cold or hot dry compaction processes, the ceramic then cools to room temperature. In embodiments, cooling may be controlled to affect the cooling rate. Preferred cooling rates are in the range of 1 K/min to 50 K/min, including all ranges and values therein. In non-limiting embodiments, the ceramic may be cooled to room temperature by turning off the oven, or reducing the temperature of the oven in increments over a given period of time. In further embodiments, the ceramic may be cooled by immersing the ceramic body in water after sintering.

Various process parameters may affect the resulting properties of the ceramic, such parameters might include the compression pressure, preheating duration, heating rate, sintering temperature, holding time (duration at which the oven/furnace is maintained after the oven reaches the sintering temperature), and geometry. For example, compression pressure has an illustrated effect on the density of the green compacts and ceramics. In addition, cooling rate affects the resulting microstructure of the ceramics.

With the above in mind, the methods described above provides green compact densities in the range of 2500 kg/m$^3$ to 2850 kg/m$^3$, including all values and ranges therein, and more preferably in the range of 2700 kg/m$^3$ to 2850 kg/m$^3$. For example, a compaction pressure of 160 MPa may be selected during the manufacturing process to reduce energy consumption, while still achieving a green density of approximately 2725 kg/m$^3$, if the goal is to achieve high compression strength. Sintered densities are preferably in the range of 2550 kg/m$^3$ to 2725 kg/m$^3$, including all values and ranges therein, and more preferably 2700 kg/m$^3$ to 2725 kg/m$^3$. In addition to the effects of compression pressure and sintering parameters, ceramic properties, and particularly microstructure, are also affected by the cooling of the ceramic from sintering and is discussed further below.

Figure 6A:
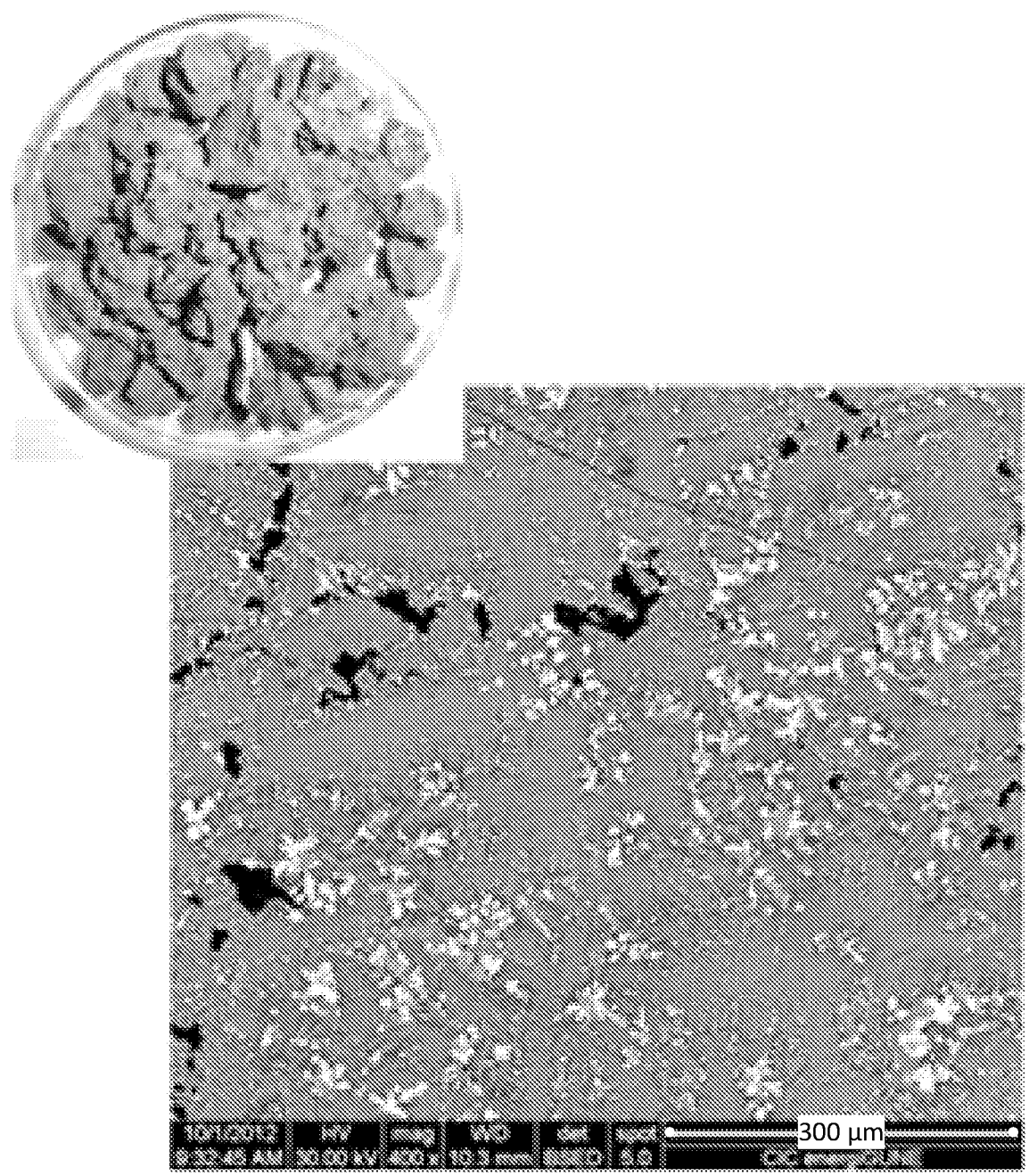
FIG. 6a is an environmental scanning electron microscope (ESEM) image of the as received slag, taken at 400× magnification.
Figure 6B:
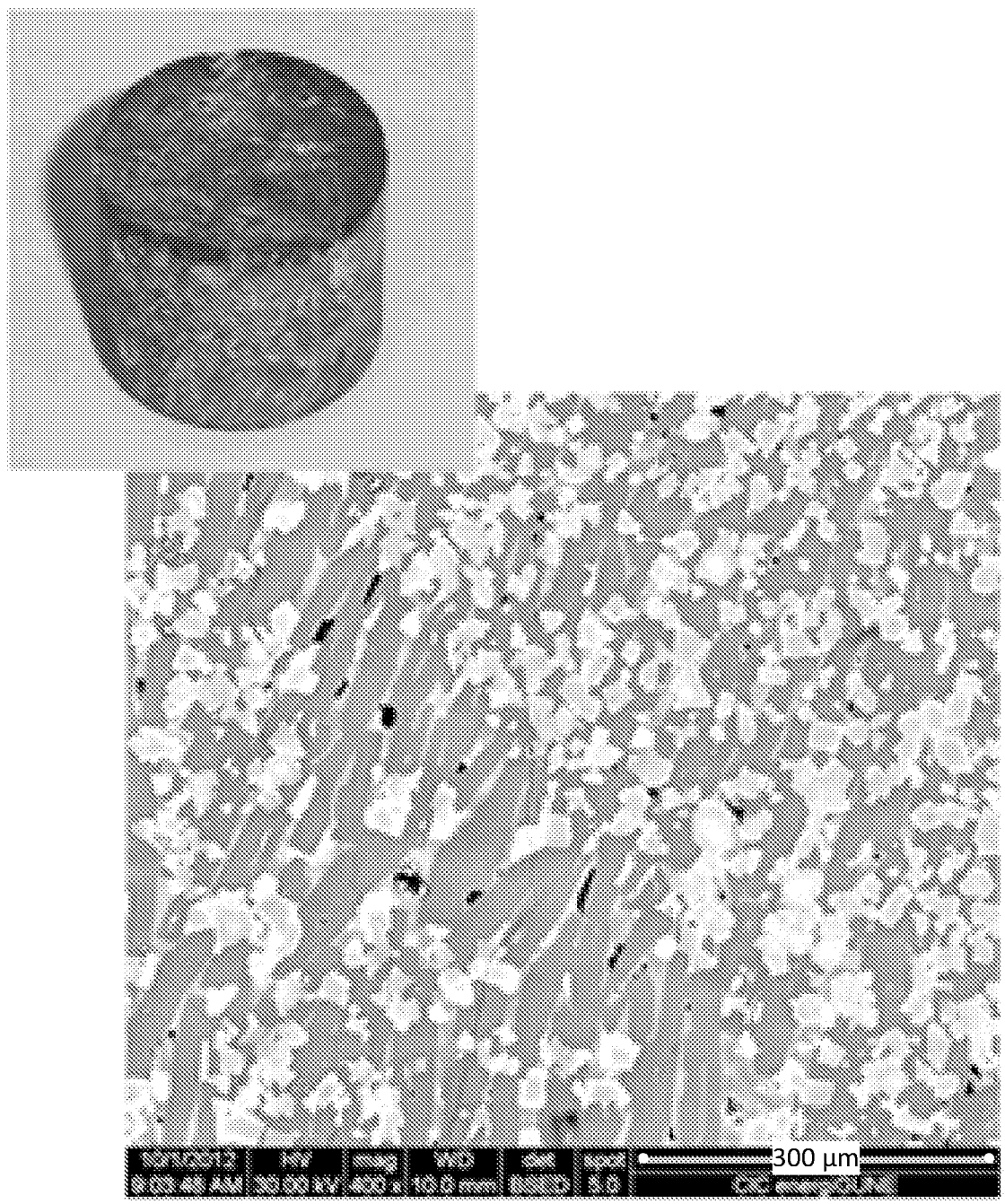
FIG. 6b is an environmental scanning electron microscope (ESEM) image of the ceramic, taken at 400× magnification.
Figures 7A, 7B, 7C:
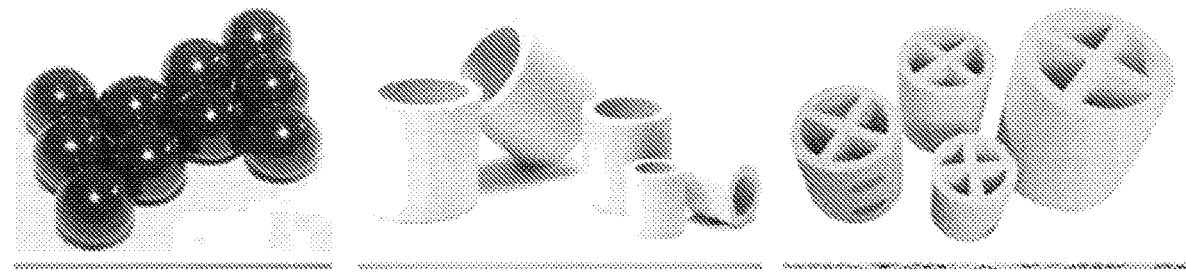
FIG. 7a illustrates an example of a geometric configuration of the ceramic.
FIG. 7b illustrates an example of a geometric configuration of the ceramic.
FIG. 7c illustrates an example of a geometric configuration of the ceramic.
Figures 7D, 7E, 7F:
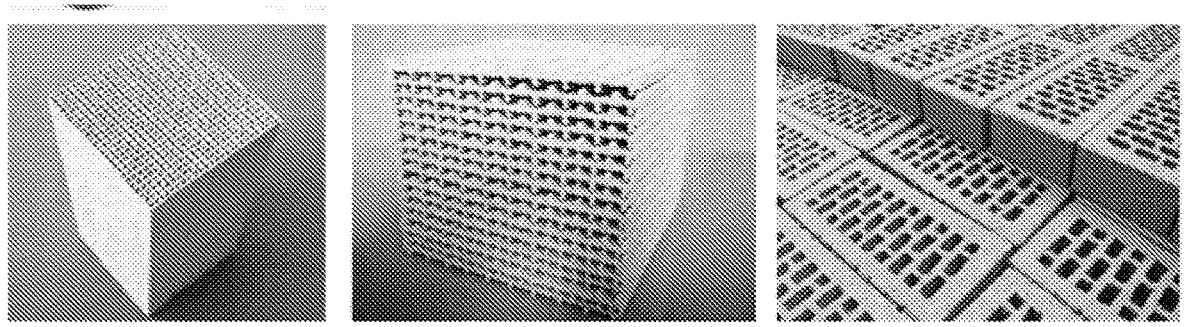
FIG. 7d illustrates an example of a geometric configuration of the ceramic.
FIG. 7e illustrates an example of a geometric configuration of the ceramic.
FIG. 7f illustrates an example of a geometric configuration of the ceramic.
Figure 8A:
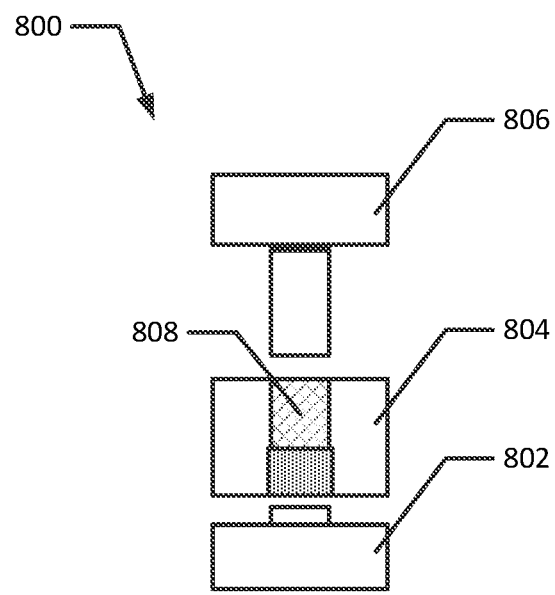
FIG. 8a illustrates an exploded view of a schematic of an exemplary mold die for compacting the slag powder.
Figure 8B:
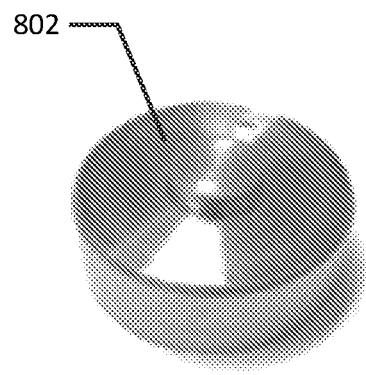
Figure 8C:
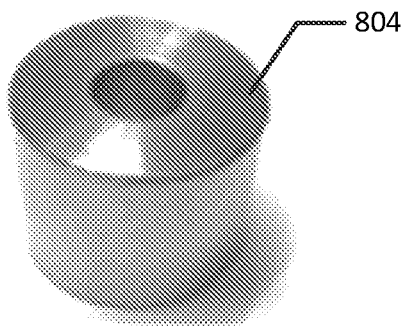
FIG. 8c is a photographic image of a cylindrical die component of the mold die of FIG. 8A.
Figure 8D:
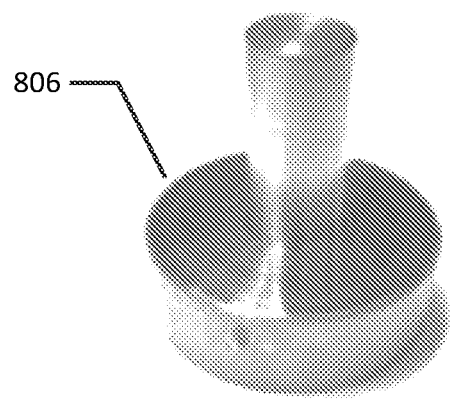

Referring now to FIGS. 6a and 6b, FIG. 6a is an environmental scanning electron microscope image (ESEM) of the as-received EAF slag and FIG. 6b is an ESEM image of the ceramic after compaction. As can be seen, an increased number of crystal grains, having a larger size, are present in the ceramic after sintering. As alluded to above, the microstructure of the ceramic is affected by the cooling rate of the ceramic after sintering. Relatively lower cooling rates lead to formation of bigger crystals as compared to the crystal size formed by quenching, as shown in FIG. 6b. Bigger crystals provide different mechanical properties of the ceramic (e.g., hardness, toughness) and a relatively more durable final material. Accordingly, larger crystals may be achieved at a cooling rate in the range of 1 K/min to 10 K/min, including all values and ranges therein, than at relatively higher cooling rates.

In addition, the ceramics preferably exhibit a thermal stability (i.e., changes in mass relative to changes in temperature) of less than 1% of the mass at room temperature (20° C. to 25° C.) over a temperature range of 40° C. to 1100° C., with a heating rate of 10 K/min. The ceramics also preferably exhibit specific heat capacity Cp in the range of 0.66 Jg$^{-1}$K$^{-1}$ at 100° C. to 1.19 Jg$^{-1}$K$^{-1}$ at 1000° C. Further, the ceramics exhibit a compressive strength at failure in the range of 40 MPa through 120 MPa, including all value sand ranges therein, measured at a strain rate of 10$^{-6}$ mm/mm/min when measured using ASTM standard ASTM C1424-15. The ceramics may be formed into a number of shapes including, but are not limited to: balls, cylinders, Raschig rings, honeycomb structure, wave plates, channeled bricks, etc. as illustrated in FIG. 7a through 7f.

In addition, the resulting ceramics comprise: a consolidated body of steel slag, wherein the steel slag comprises and preferably consists essentially of: aluminum oxide ($Al_2O_3$) present in the range of 2 to 12 wt. %, calcium oxide (CaO) present in the range of 24 to 60 wt. %, iron oxide ($Fe_2O_3$) present in the range of 20 to 33 wt. %, magnesium oxide (MgO) present in the range of 3 to 15 wt. %, silicon dioxide ($SiO_2$) present in the range of 9 to 20 wt. %, optionally one or more of the following: MnO, $TiO_2$, and free CaO present in the range of 0.01 to 8 wt. % and inevitable impurities, wherein the wt % is the weight percent relative to the total weight of the ceramic to provide, including the inevitable impurities, 100 wt. %. Each component may be presented within the ranges expressed above or at increments thereof, selected at 0.1 wt %. The CaO present from 24 to 60 wt % is preferably reacted with other components forming various CaO crystal phases (this is 24-60% CaO), which may include, for example, one or more of the following: $Ca_2SiO_4$, $4CaO \cdot Al_2O_3 \cdot Fe_2O_3$, $Ca_2Al(AlSiO_7)$, $Ca_3SiO_5$, $2CaO \cdot Al_2O_3 \cdot SiO_2$, FeO, $Fe_3O_4$, MgO, and $SiO_2$. The unreacted amount (free CaO) may exhibit different crystal phases (included in the traces %) than the reacted CaO. Further iron is preferably excluded from the alloy composition.

EXPERIMENTAL EXAMPLE

Figure 4:
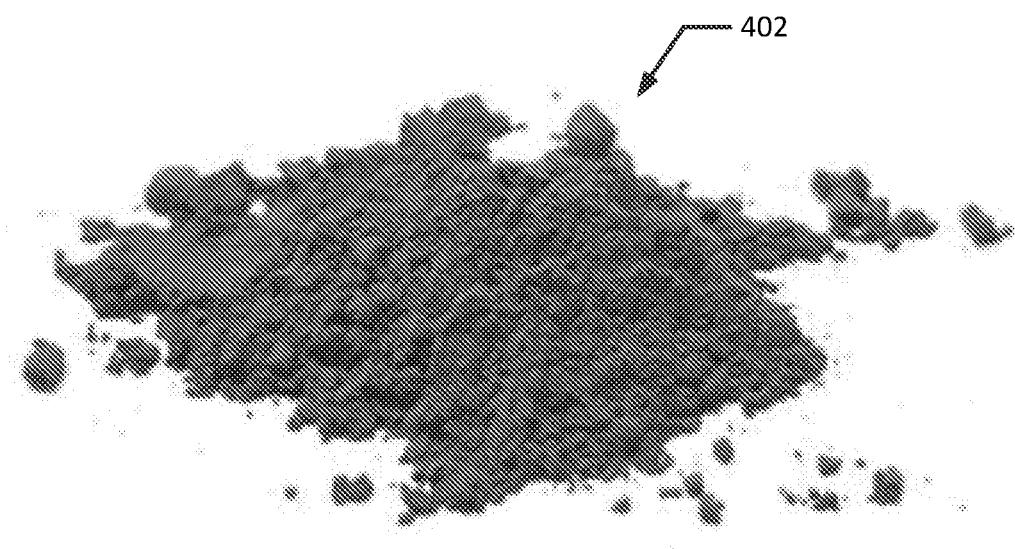
FIG. 4 illustrates an image of slag powder after grinding.

EAF slags, black slags, provided by Emirates Steel (seen in FIG. 2) were used to obtain the ceramics. The slags had diameters (largest linear dimension) of varying sizes less than 5 mm. The as-received slags were ball milled for 0.75 hour using a RETSCH PM 100 ball miller and 32 balls of 2 mm (20 balls), 5 mm (10 balls) and 15 mm (2 balls) in diameter. The powder was then sieved to obtain a homogenous mixture with particle sizes inferior to 200 μm in size (seen in FIG. 4). After sieving, the powder was subjected to a heat treatment process at 1,000° C. for 6 hours to oxidize iron in the slag powder. The heat treated powder was then mixed with a binder, a mixture of poly-vinyl alcohol (PVA) present at 4 wt. % of the binder and water present at 96 wt. % of the binder, wherein the binder was present at 5 wt. % of the total powder formulation.

The heat treated powder was then compacted using a cold, dry powder compaction using a mold and a compression press. The mold system is illustrated in FIGS. 8a through 8d. The mold 800 includes three parts made of tool steel: a base 802, a cylindrical die 804, and a punch 806. The system forms a mold cavity 808 of 20 mm in diameter and 45 mm in height. A mixture of ethanol and talc was used as a dry lubricant on the mold cavity surfaces to reduce the friction on the walls of the mold. The ethanol was present at a level of 60 wt % and the talc was present at a level of 40 wt % of the ethanol/talc formulation. The mold was placed in a uni-axial press, a CARVER Auto CH 3889, and samples were formed by subjecting the mold to forces in the range of 1000 kgf (9 kN) to 7000 kgf (70 kN) providing compaction pressures of about 30 MPa to 216 MPa. Five compaction forces were selected in total. An example of a resulting green compact is shown in FIG. 5a.

The green compacts were then sintered. A temperature program to raise the temperature and sinter the green compact, which included a preheating stage and a sintering stage. During the preheating stage, a heating rate of 5 K/min was used up to raise the temperature from room temperature (20° C. to 25° C.) to sintering temperature. During preheating, the moisture evaporated and the binder burned. A sintering temperature of 1200° C. was selected with a holding time of 1 hour. Powder compaction and sintering is understood to increase strength. After the sintering step, the ceramics were allowed to cool. The ceramic product was obtained without any apparent cracks as shown in FIG. 5b. A sample was cut through the middle to check for cracking in the inside and no cracks were detected to a human viewer.

A number of physical and mechanical properties of the slag powders, green compacts, and ceramics were characterized, including the particle size, the density, the thermal stability, the specific heat capacity, the compressive strength, and the thermal expansion coefficient. All experiments were repeated 3 times on different samples to verify the reproducibility of the experimental results.

Beginning with characterization of the slag powder, after milling, the powder was sieved according to the ASTM standard (ASTM B925-15) to obtain particles with a diameter inferior to 0.2 mm. To determine the particle size distribution of the milled EAF slag powder, the laser diffraction (LD) method was employed using a HORIBA LA-950V2 laser particle analyzer. Without being bound to any particular theory, the measurement of LD relates to the way particles of given sizes will scatter the laser light; that is, the angle at which the light is scattered is affected by the particle size. Larger particles scatter light at smaller angles, and small particles will scatter light at wider angles. The pattern of scattered light detected, which is defined by intensity and angle, is then correlated to particle size distribution. The total light scattered is proportional to the total number of particles.

Figure 9:
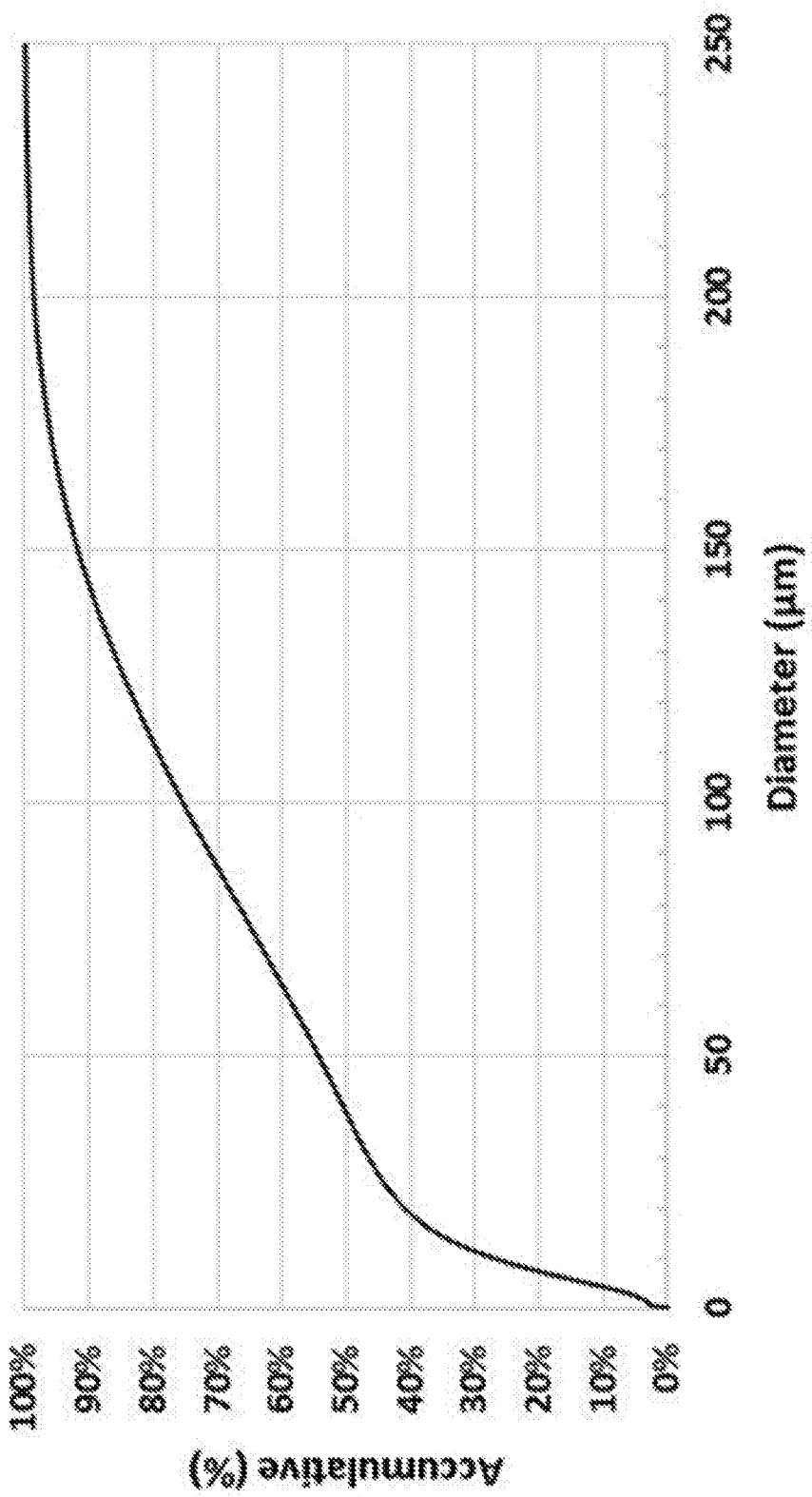
FIG. 9 is a graph of cumulative particle diameter (largest linear dimension) of the ground and sieved particles.

The apparent density, compressibility, porosity, roughness, green strength, and other properties may be, in part, dependent on the particle size. For example, powder size, (i.e., diameter or largest linear dimension), affects powder compaction. Finer particles may be more difficult to compact since more pressure may be needed to obtain a desired density. The measured particle size distribution provided after milling and sieving is illustrated in FIG. 9 and the experimental results are provided in Table 1.

TABLE 1

Powder Size Distribution

| Measurement | Value |
|---|---|
| Median Size (μm) | 38.7 |
| Mean Size (μm) | 58.5 |
| Standard Deviation (μ) | 56.5 |
| Mode Size (μm) | 123.7 |

The mean particle size of the powder was determined to be 58.5 μm and between a range of 5 μm and 200 μm.

Figure 10:
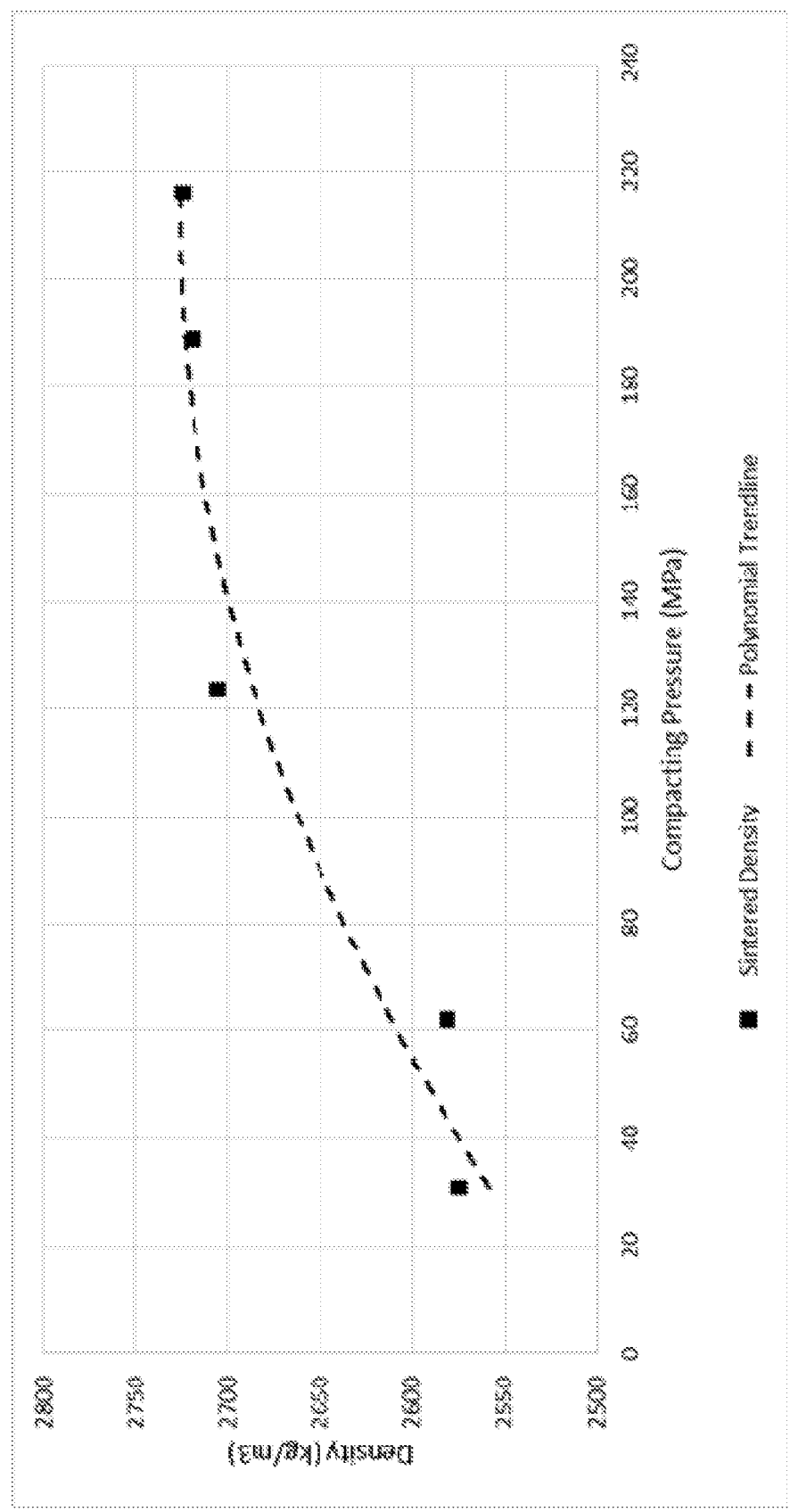
FIG. 10 is a graph of the sintered density relative to compacting pressure.

To calculate the density of the green compacts and the sintered ceramics, the dimensions of the samples (diameter and height in our example) were measured with a digital Vernier caliper and the sample was weighted with a balance KERN ACS 220-4. Measurements were taken before and after sintering. Experimental results are shown in FIG. 10. From the experimental results, the maximum density of the sintered product is obtained at a compacting pressure of 220 MPa. However, there appears to be a relatively small change in density from a compacting pressure of 160 MPa to 220 MPa.

Figure 11:
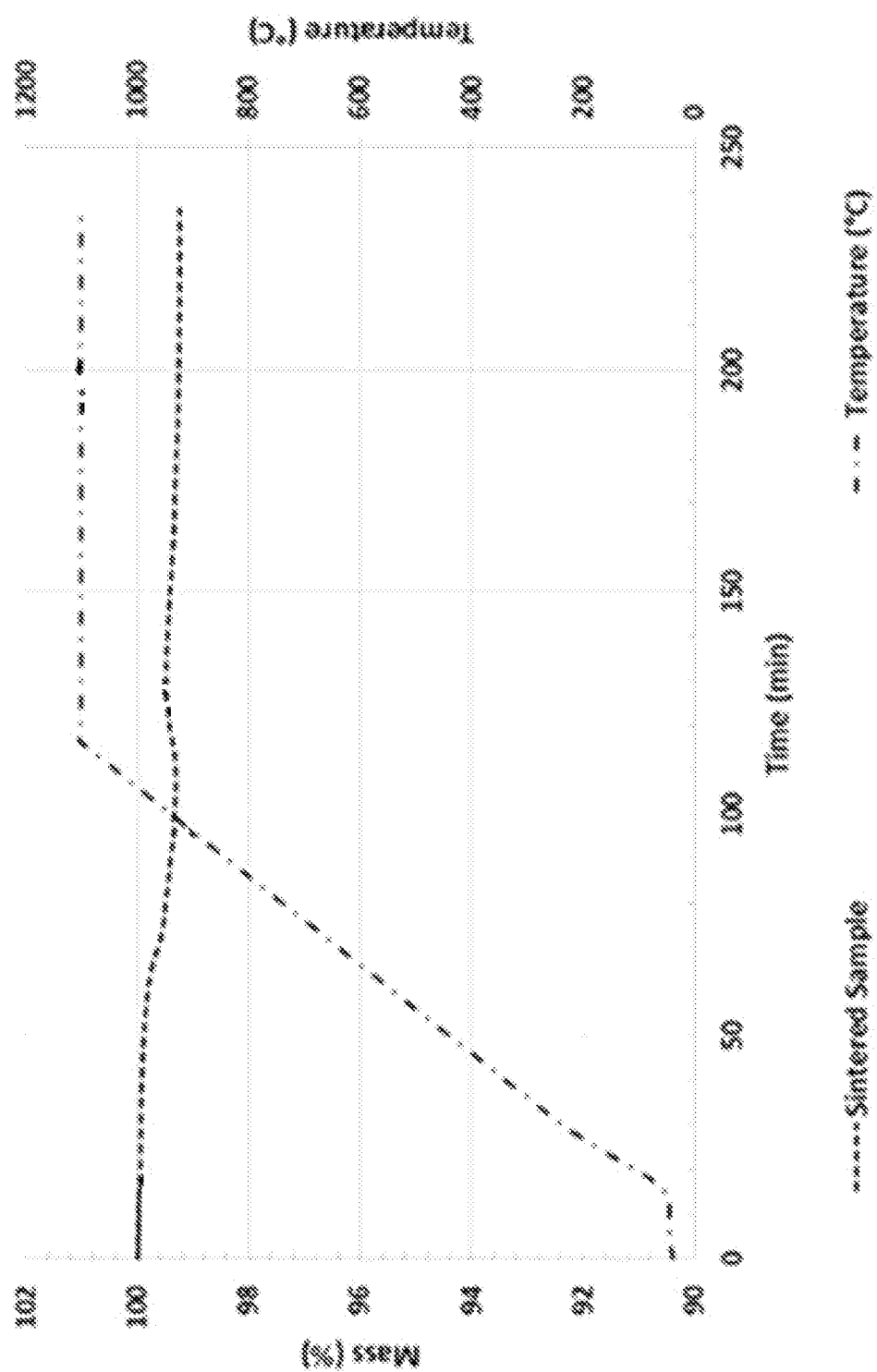
FIG. 11 is a graph of mass percent change relative to temperature of the ceramic (sintered sample).

To determine the thermal stability of the ceramic, a Simultaneous Thermal Analyzer STA 449-F3 from NETZSCH was used. During the test, the reduction or gain in mass is measured relative to the temperature at which the sample is exposed. A sample of 73 mg was measured in 3.4 ml alumina crucible while raising the temperature of the instrument chamber from 40° C. to 1100° C. with a heating rate of 10 K/min. FIG. 11 provides a graph illustrating the change in mass with change in temperature over time. As can be seen, the thermal stability (i.e., mass gain/loss) is less than 1 percent of the initial weight of the ceramic.

Figure 12:
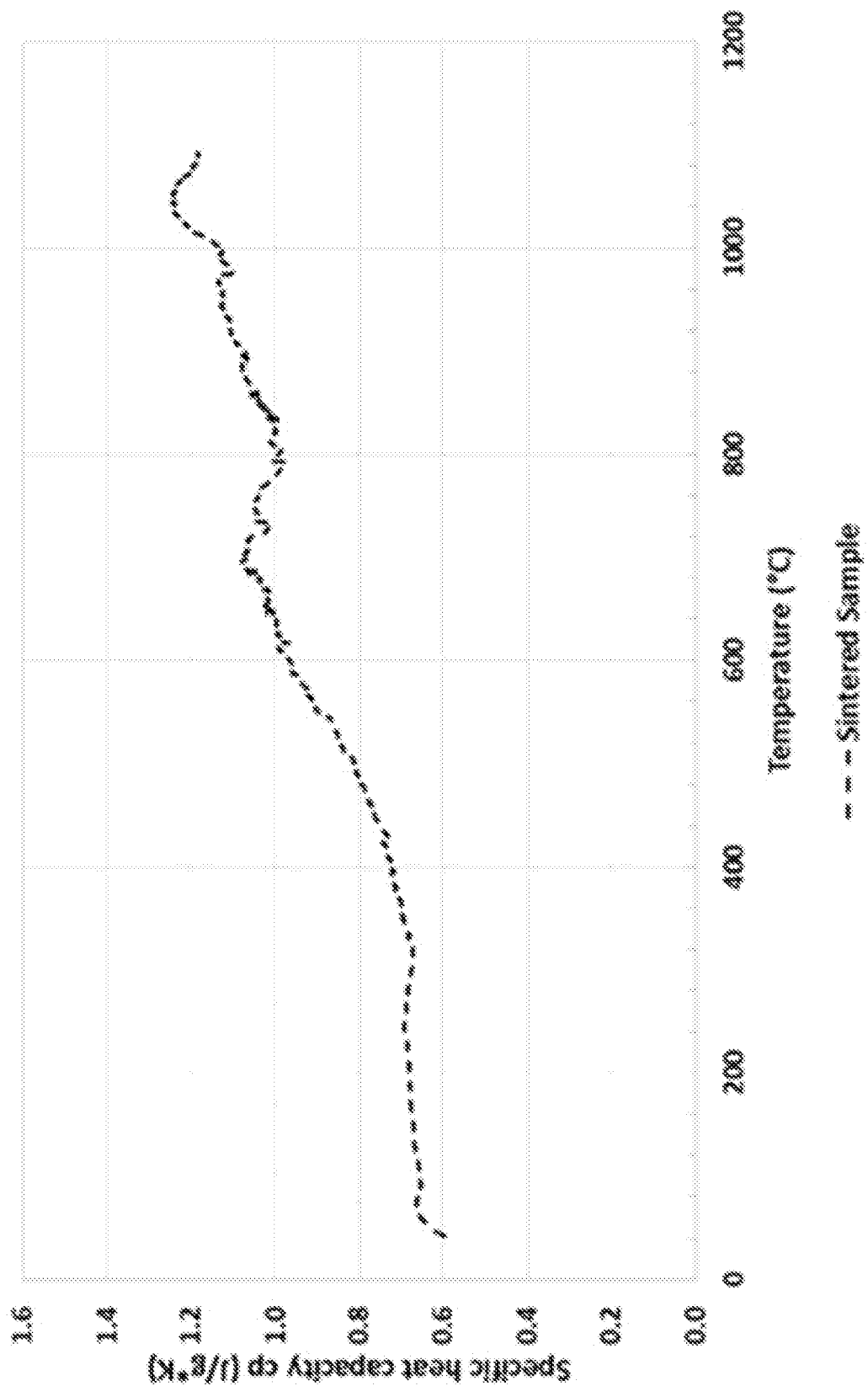
FIG. 12 is a graph of specific heat capacity relative to temperature of the ceramic (sintered sample).

In order to determine the specific heat capacity of the powder, a differential scanning calorimeter DSC 404 from NETZSCH was used. The specific heat capacity was measured using the ratio method. By comparing the heat flow rate of the measured sample with the heat flow rate of a standard material under the same conditions, it is possible to determine the specific heat capacity as a function of temperature. The samples were measured on a platinum crucible using a heating rate of 10 K/min from 40° C. to 1100° C. FIG. 12 illustrates the specific heat capacity relative to temperature. As can be seen the specific heat capacity at 100° C. is 0.66 $J·g^{-1}·K^{-1}$ and at 1,000° C. the heat capacity is 1.19 $J·g^{-1}·K^{-1}$.

Figure 13:
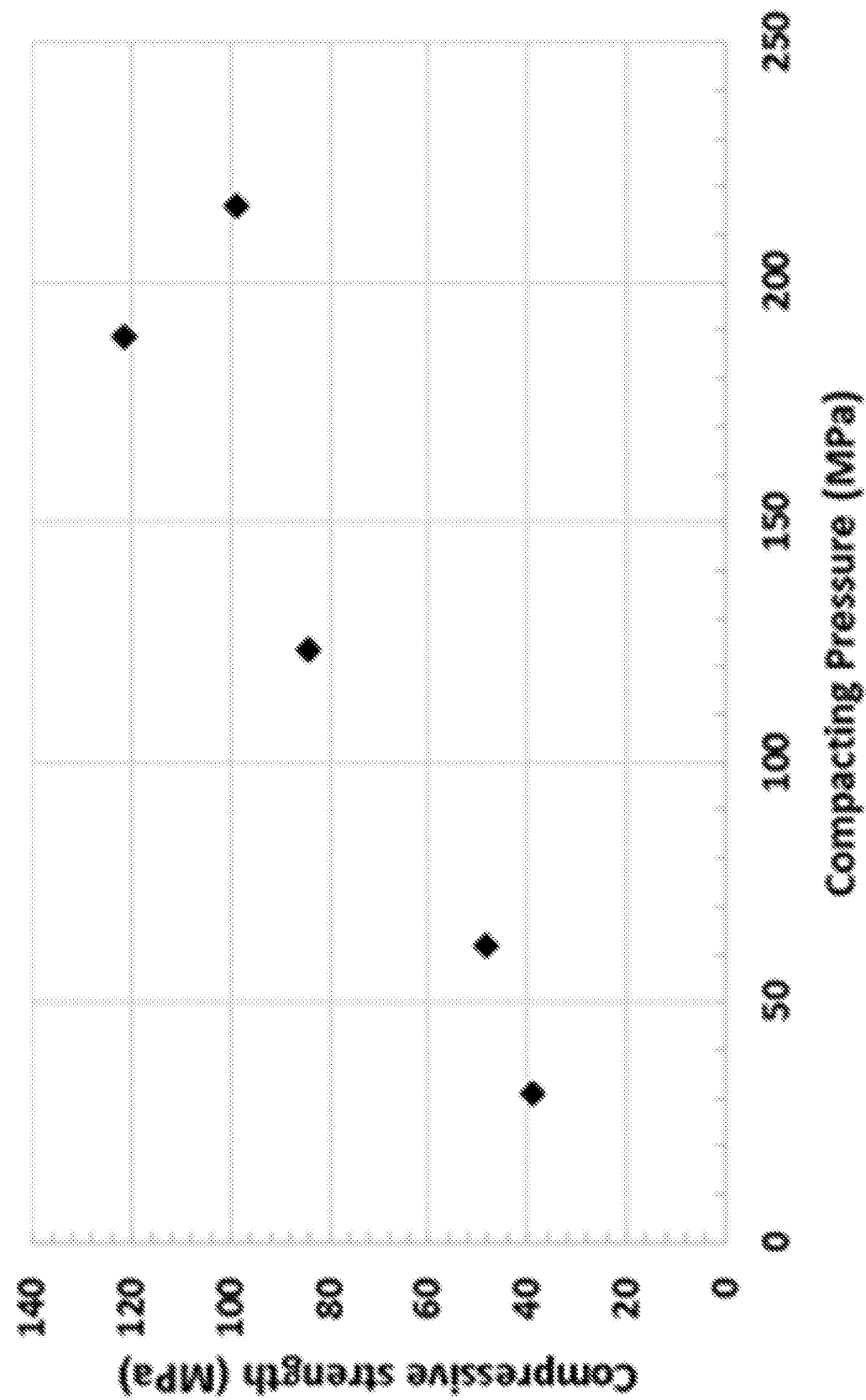
FIG. 13 is a graph of the compressive strength relative to compacting pressure.

Compressive tests were performed according to ASTM C1424-15 at room temperature (20° C. to 25° C.) on the sintered ceramics using an INSTRON 5982 testing machine, in order to determine the compressive strength of the ceramic. The testing machine measures force applied to the sample and the displacement (or deformation of the sample in the direction in which the load is applied). By previously measuring the dimensions of the sample, the strain and stress is calculated. The strain rate used was of $10^{-6}$ mm/mm/min, in order to obtain a quasi-static condition on the test. The cylindrical samples have average dimensions of 19.7 mm in diameter and 12.2 mm in height. Compressive force was applied and testing was performed until sample failure, according to the stress-strain curve, to determine a maximum stress the sample could hold before failing. The compressive strength results are seen in FIG. 13. The data indicates that relatively higher compression pressure produces relatively higher densities, which exhibit relatively higher compressive strengths of 120 MPa and greater than that of graphite and most compressed alumina oxide powders. The relatively higher density helps the particles to have more interactions, restricting the development of cracks, which makes it stronger.

A brief summary of the experimental results of the slag ceramic is provided in Table 2 for ceramic samples compacted at a pressure of 180 MPa.

TABLE 2

Experimental values of EAF slag ceramic.

| Measurement | Unit | Value |
|---|---|---|
| Particle size (mean value) | Mm | 58.5 |
| Density | $kg·m^{-3}$ | 2725 |
| Thermal stability (mass gain/loss) | % | <1 |
| Specific heat capacity @ 100° C. | $J·g^{-1}·K^{-1}$ | 0.66 |
| Specific heat capacity @ 1000° C. | | 1.19 |
| Compressive strength* | MPa | 120 |

*Measured on ceramic samples compacted at a pressure of 180 MPa.

This work demonstrates the ability to produce ceramics from steel slag, wherein the ceramics may be provided with different densities and compressive strength to meet a wide range of applications by changing, e.g., the compacting pressure or cooling rate.

Figure 14:
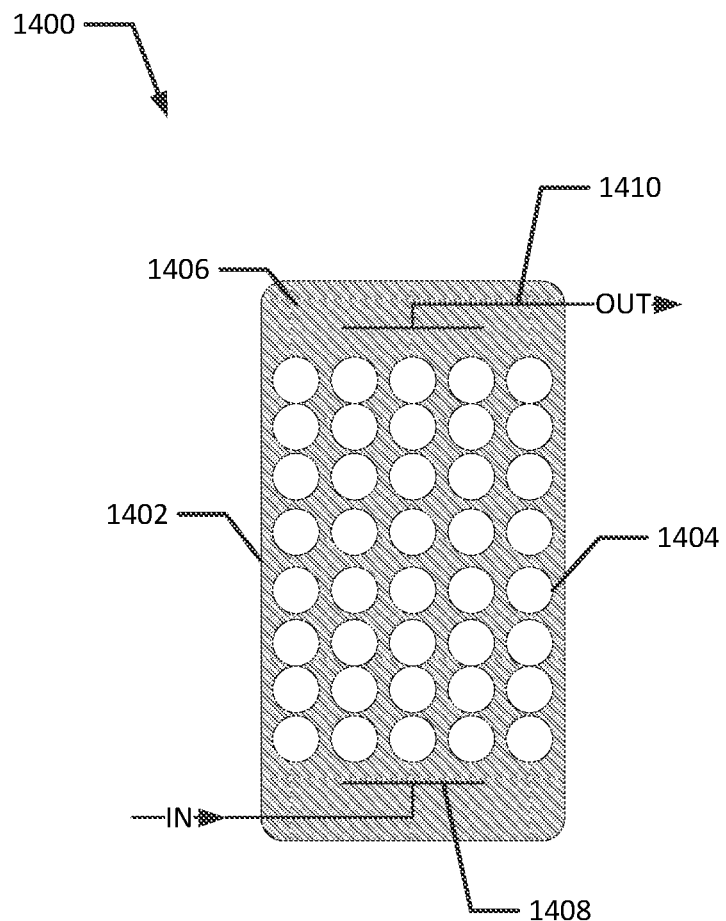
FIG. 14 is a schematic of a thermal energy storage system.

The ceramics described herein may be employed in a number of applications. Such applications may include energy storage applications as the ceramics can store heat in the solid material up to 1000° C., based on the data above. For example, the ceramics may be used as a solid storage media in high-temperature thermal energy storage (TES)

systems. A schematic of an example of a system 1400 is illustrated in FIG. 14, wherein the system includes a storage tank 1402. The ceramics 1404 may, particularly, be employed as filler materials in a packed bed thermal energy storage system using a gas (air, pressurized air, supercritical $CO_2$, flue gas, etc.) as heat transfer fluid 1406. An inlet diffuser 1408, the storage container, the ceramic bodies and an outlet diffuser 1410 provide a flow path for the heat transfer fluid to circulate in direct contact with the ceramic modules to charge and discharge the thermal energy storage system.

When utilized in thermal energy storage, the slag powder is preferably compacted into shapes called TES modules, which are then sintered. These modules may assume the forms described above, including: balls, cylinders, Rashid rings, honeycomb structure, wave plates, channeled bricks, etc. as seen in FIGS. 7a through 7f. Preferably the shapes provide a suitable exchange surface (i.e., surface area) between the module and the heat transfer fluid. Gasses, such as dry air or $CO_2$, exhibit a relatively low heat transfer coefficient; thus, providing relatively large heat exchange surfaces may be critical.

As it is used in a random packed-bed configuration in a thermal energy storage tank, for example, the ceramic, as filler, has to resist to the thermal cycling and thermal stress between charge and discharge temperatures. But it also has to resist, at the same time, the physical weight of other ceramic fillers packed on top of it. Mechanical properties are then very important to avoid degradation of the ceramic in the system and make sure that the material does not have to be replaced during the all life time expectancy of the TES system (e.g., 25 years for a CSP plant).

Control of the packing arrangement is also important to manage heat transfer fluid pressure drop and homogenous flow in the tank. Controlling the microstructure through cooling and shaping the ceramic helps to uniformly organize the fillers in the tank and reduce pressure drop. Recycling steel slag for several purposes contributes to the reduction of waste from the industry and environmental impact. From the laboratory tests, steel slag has shown promising stability at high temperatures and higher heat capacity than other materials used for TES. It was shown that it is possible to fabricate a solid based on EAF steel slag powder. This new solid material has an intrinsic benefit due to its sustainable nature. After the oxidation process of the powder, compaction, and sintering, the TES modules have shown to be thermally stable, and have a suitable specific heat capacity and compressive strength. It could also be used at higher temperatures, giving the possibility to be used as TES storage media up to 1100° C.

Among renewable energy sources that employ thermal energy storage systems, concentrated solar power (CSP) is a promising technology that has been rapidly commercially deployed in recent years. During 2014, its total installed capacity worldwide has increased of 27% to a total value of 4.4 GW. It has doubled since then with about 10.1 GW close to be operational. Huge efforts are made to decrease the cost and at the same time increase the performance of CSP systems to make this technology more competitive. The primary advantage of CSP compared to solar photovoltaic or wind, for instance, is dispatchability due to the possible integration of a thermal energy storage (TES) system. TES gives flexibility to the power delivery in order to manage the delay between electricity demand and supply. Moreover, TES can also produce base load power if the storage capacity is sufficient. The TES system is then charged during day when the sun energy is abundantly available, to be reused after sunset and at night continuing in this way to generate clean electricity either 24 hours a day, or precious dispatchable power for covering peak demand.

Commercial CSP plants currently operate on temperatures range between 290° C. and 565° C. Next generation of CSP plants are intended to operate at higher temperature from 600° C. up to 1000° C. and more to increase the efficiency of the power block by using for example combined Brayton-Rankine cycles and increase the conversion from solar to electricity. Therefore new TES materials that can reach high-temperature are needed. Targeted storage media has to be thermally stable up to 1000° C., corrosion resistant at high temperature, available in large quantity, inexpensive, as well as presenting large storage density.

Another contemplated application is the waste heat recovery in industrial applications that need and produce heat at high temperature and dissipate hot flue gas in the atmosphere. This waste heat could be recovered and stored in the ceramic to be re-injected in the industrial process and save energy.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

The invention claimed is:

1. A method of forming a ceramic from steel slag for use as a thermal energy storage material, comprising:
    milling steel slag to form powder;
    removing free iron from said powder with a magnet;
    heat treating said powder at a temperature in the range of 700° C. to 1200° C. for a time period in the range of 1 hour to 10 hours and oxidizing retained iron in said powder;
    compacting said powder at a compression pressure in the range of 30 MPa to 300 MPa; and
    sintering said powder at a temperature in the range of 700° C. to 1400° C. to provide a ceramic.

2. The method of claim 1, further comprising preheating said powder prior to sintering wherein said green compact is preheated at a rate of 1 K/min to 10 K/min.

3. The method of claim 1, wherein said sintering is performed after compacting, wherein said compression pressure is in the range of 120 MPa to 300 MPa, and said sintering temperature is in the range of 1200° C. to 1400° C.

4. The method of claim 3, wherein said compression pressure is in the range of 120 MPa to 180 MPa.

5. The method of claim 1, wherein sintering is performed concurrently with said compacting.

6. The method of claim 5, wherein said compression pressure in the range of 120 MPa to 180 MPa.

7. The method of claim 1, wherein said sintering is performed for a time period of 4 hours.

8. The method of claim 1, further comprising mixing additives into said powder after heat treating said powder.

9. The method of claim 8, wherein said additives include a binder and a carrier.

10. The method of claim 9, wherein said binder includes at least one polymer selected from the following: poly(vinyl alcohol), poly(alkylene carbonate), starch, carboxymethylcellulose, dextrin, and waxes.

11. The method of claim 8, wherein said additives include a dry lubricant.

12. The method of claim 8, wherein said additives are present in the range of 0 wt % to 60 wt %.

13. The method of claim 1, wherein said steel slag is EAF slag.

14. A method of forming a ceramic from steel slag for use as a thermal energy storage material, comprising:
milling steel slag to form powder;
removing free iron from said powder with a magnet;
heat treating said powder at a temperature in the range of 700° C. to 1200° C. for a time period in the range of 1 hour to 10 hours and oxidizing retained iron in said powder;
compacting said powder at a compression pressure in the range of 20 MPa to 300 MPa; and
sintering said powder for four hours at a temperature in the range of 700° C. to 1400° C. to provide a ceramic.

15. The method of claim 14, wherein said sintering is performed after compacting, and said sintering temperature is in the range of 1200° C. to 1400° C.

16. The method of claim 14, wherein said sintering is performed concurrently with said compacting, and said compression pressure is in the range of 120 MPa to 180 MPa.

17. A method of forming a ceramic from steel slag for use as a thermal energy storage material, comprising:
milling steel slag to form powder;
removing free iron from said powder with a magnet;
heat treating said powder at a temperature in the range of 700° C. to 1200° C. for a time period in the range of 1 hour to 10 hours and oxidizing retained iron in said powder;
mixing additives into said powder;
compacting said powder at a compression pressure in the range of 20 MPa to 300 MPa; and
sintering said powder at a temperature in the range of 700° C. to 1400° C. to provide a ceramic.

18. The method of claim 17, wherein said additives include a binder and a carrier.

19. The method of claim 18, wherein said binder includes at least one polymer selected from the following: poly(vinyl alcohol), poly(alkylene carbonate), starch, carboxymethylcellulose, dextrin, and waxes.

20. The method of claim 17, wherein said additives include a dry lubricant.

* * * * *